US008818614B1

(12) United States Patent
Lekutai

(10) Patent No.: US 8,818,614 B1
(45) Date of Patent: Aug. 26, 2014

(54) PERSONAL EVENT DATA RECORDER

(75) Inventor: Gaviphat Lekutai, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1936 days.

(21) Appl. No.: 11/548,981

(22) Filed: Oct. 12, 2006

(51) Int. Cl.
*G08B 25/12* (2006.01)
*G06K 9/00* (2006.01)
*G06F 17/00* (2006.01)
*G06F 19/00* (2011.01)

(52) U.S. Cl.
USPC .......... 701/32.2; 701/70

(58) Field of Classification Search
CPC .......... H04M 1/667; G08B 25/016
USPC .......... 341/123; 342/417; 375/220, 355; 455/323, 334, 410, 420; 701/1, 29, 33, 701/32.2, 33.2–33.4, 35; 713/151–152, 713/161, 164–165
See application file for complete search history.

(56) References Cited

U.S. PATENT DOCUMENTS 6,810,309 B2 * 10/2004 Sadler et al. .......... 701/1
6,839,710 B2 * 1/2005 Dabbish et al. .......... 701/35
6,895,310 B1 * 5/2005 Kolls .......... 701/1
6,965,294 B1 * 11/2005 Elliott et al. .......... 340/5.2
7,266,430 B2 * 9/2007 Basson et al. .......... 701/1
7,366,892 B2 * 4/2008 Spaur et al. .......... 713/151
7,400,954 B2 * 7/2008 Sumcad et al. .......... 701/29
2003/0154009 A1 * 8/2003 Basir et al. .......... 701/35
2003/0204290 A1 * 10/2003 Sadler et al. .......... 701/1
2004/0002799 A1 * 1/2004 Dabbish et al. .......... 701/35
2004/0024706 A1 * 2/2004 Leduc .......... 705/41
2004/0185842 A1 * 9/2004 Spaur et al. .......... 455/420
2004/0203696 A1 * 10/2004 Jijina et al. .......... 455/420
2005/0137753 A1 * 6/2005 Basson et al. .......... 701/1
2006/0069473 A1 * 3/2006 Sumcad et al. .......... 701/29
2006/0085153 A1 * 4/2006 Oesterling et al. .......... 702/85

* cited by examiner

*Primary Examiner* — Khoi Tran
(74) *Attorney, Agent, or Firm* — Hartman & Citrin LLC

(57) ABSTRACT

A personal event data recorder (PEDR) is provided. The PEDR may be integrated within a mobile communications device or may be provided as a separate add-on device operatively linked to the mobile communications device. The PEDR is configured to activate a number of sensors based upon an event trigger and monitor and record event data from the sensors. The PEDR is further configured to store the recorded event data in one of a memory and a network database. The PEDR may also be utilized with a secondary sensor system such as, but not limited to, a vehicle sensor system or a security sensor system.

19 Claims, 5 Drawing Sheets

PERSONAL EVENT DATA RECORDER

TECHNICAL FIELD

This invention relates generally to event data recorders and, more specifically, to a personal event data recorder.

BACKGROUND OF THE INVENTION

The Federal Aviation Administration (FAA) requires large commercial aircraft and some smaller commercial, corporate, and private aircraft to be equipped with two "black boxes" to record data, radio transmissions, and cockpit sounds during an aircraft emergency situation. Data is recorded using a Flight Data Recorder (FDR) and radio transmissions and cockpit sounds are recorded using a Cockpit Voice Recorder (CVR). Typically these devices are designed to withstand intense heat, high pressures, and prolonged exposure to water and chemicals. These design characteristics enable investigators to retrieve the "black boxes" in satisfactory condition for data retrieval.

The FAA has further mandated that these "black boxes" record a minimum number of metrics from various sensors positioned throughout the aircraft. Common metrics includes acceleration, airspeed, altitude, flap settings, various engine parameters, outside temperature, outside pressure, and cabin temperature and pressure. This data is sent from the sensors and stored in the FDR. The CVR records radio transmission between the aircraft and air traffic control units. The CVR also records cockpit sounds from several microphones dispersed throughout the cockpit. In the event of an aircraft crash, investigators are capable of downloading the data stored on the FDR and CVR to a readout system, and the data is analyzed in an effort to determine the cause of a crash.

Automobile manufacturers have installed similar devices in the vehicles they manufacture. These devices aim to offer similar functionality to their aircraft counterparts, by retrieving data from sensors such as airbag deployment sensors, impact sensors, brake sensors, and acceleration sensors, and storing this data in an event data recorder (EDR). After a wreck, investigators may extract this data to determine, among other things, the responsible party.

Some automobile manufacturers have developed more advanced vehicle EDRs that are capable of wireless communication. The most popular of these systems is OnStar®, which is offered exclusively through General Motors Corporation. OnStar® systems allow a user to communicate with a service center via a cellular network. The service center can aid users by contacting them automatically if the vehicle detects, via one or more sensors, an adverse condition such as the deployment of an airbag. Further services include remotely unlocking doors, vehicle diagnostics, directions, and traditional cellular phone service.

EDRs provide various data to aid investigators in determining the cause of an aircraft or automobile crash. These devices, however, do not provide any data with regard to the people aboard these vehicles. Further, when an individual experiences an adverse event, it is likely that the individual will not remember all of the details of the event. Thus, what is needed is a personal event data recorder (PEDR) to obtain data with regard to an adverse event.

SUMMARY OF THE INVENTION

The present invention addresses the need for devices, systems, and methods for recording adverse event data. One such device is a mobile device that is configured to receive and store event data, the mobile device includes a processor and a memory, the memory capable of storing event data acquired via at least one sensor. The sensor can be activated by an event trigger, wherein the event trigger type is configured via a settings stored in the memory. The event trigger can be a key press, a key sequence press, and/or the activation of a sensor. The memory can be further capable of storing at least one setting. One setting can be configured to manipulate the sensitivity of the sensor. Another setting can identify an event recording period.

In some embodiments, the mobile device further includes a data acquisition module, the data acquisition module being configured to accept the event data input from the sensor or sensors. The data acquisition module can be further configured to manipulate the event data based upon the setting stored in the memory.

In addition or alternatively, embodiments are provided wherein the mobile device further includes a transceiver, the transceiver being capable of sending the event data to a storage node.

In other embodiments, the mobile device includes a sensor input, the sensor input being capable of communicating with at least one external sensor.

In still other embodiments, the mobile device includes an extraction device interface, the extraction device interface being configured to communicate with a data extraction device for extraction of event data from the memory.

Some mobile devices include the functionality of a PEDR, according to the present invention. Another device, such as a PEDR, that is in communication with a mobile device is also described. The PEDR includes at least one sensor configured to acquire event data. The PEDR further includes a communications interface, the communications interface being configured to facilitate communication between the sensor and the mobile device.

In some embodiments, the PEDR includes a processor. Alternatively or in addition, the PEDR includes a memory, the memory being configured to store the event data. The memory can be further capable of storing at least one setting. A setting can manipulate the sensitivity of the sensor. Another setting can identify an event recording period.

In some embodiments, the sensor is activated by an event trigger. The type of event trigger is configured via a setting stored in the memory. The event trigger can be at least one of a key press, a key sequence press, and the activation of the sensor.

In some embodiments, the PEDR further includes a data acquisition module, the data acquisition module being configured to accept the event data input from the sensor. The data acquisition module can be configured to manipulate the event data based upon at least one setting stored in the memory.

In addition or alternatively, the PEDR further includes a transceiver, the transceiver capable of sending the event data to a storage node. The PEDR can also include a sensor input capable of communicating with at least one external sensor.

A system for acquiring event data, according to the present invention includes a mobile device configured to receive event data from at least one sensor and send the event data to a wireless network via any means for wireless communication, the wireless network including a storage node capable of storing event data. The sensor can be integral to the mobile device or in communication with the mobile device.

In some embodiments, the wireless network further includes an emergency call center that is in communication with the wireless network. The emergency call center is capable of acquiring event data from the storage node.

In other embodiments, the wireless network further includes a subscriber information node that is capable of communicating subscriber information to the storage node.

A method for acquiring event data, according to the present invention is also provided. The method includes the steps of loading at least one setting; receiving an input including at least one of a button press, a sequence press, and a sensor input, the input providing an event trigger; activating at least one sensor in response to the event trigger; and recording event data by the sensor. The method can further include the step of storing the event data in a mobile device memory, a network storage node, or both. The method can further include the step of extracting event data from the mobile device memory, the network storage node, or both.

DETAILED DESCRIPTION OF THE INVENTION

As required, detailed embodiments of the present invention are disclosed herein. It must be understood that the disclosed embodiments are merely exemplary of the invention that may be embodied in various and alternative forms, and combinations thereof. As used herein, the word “exemplary” is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
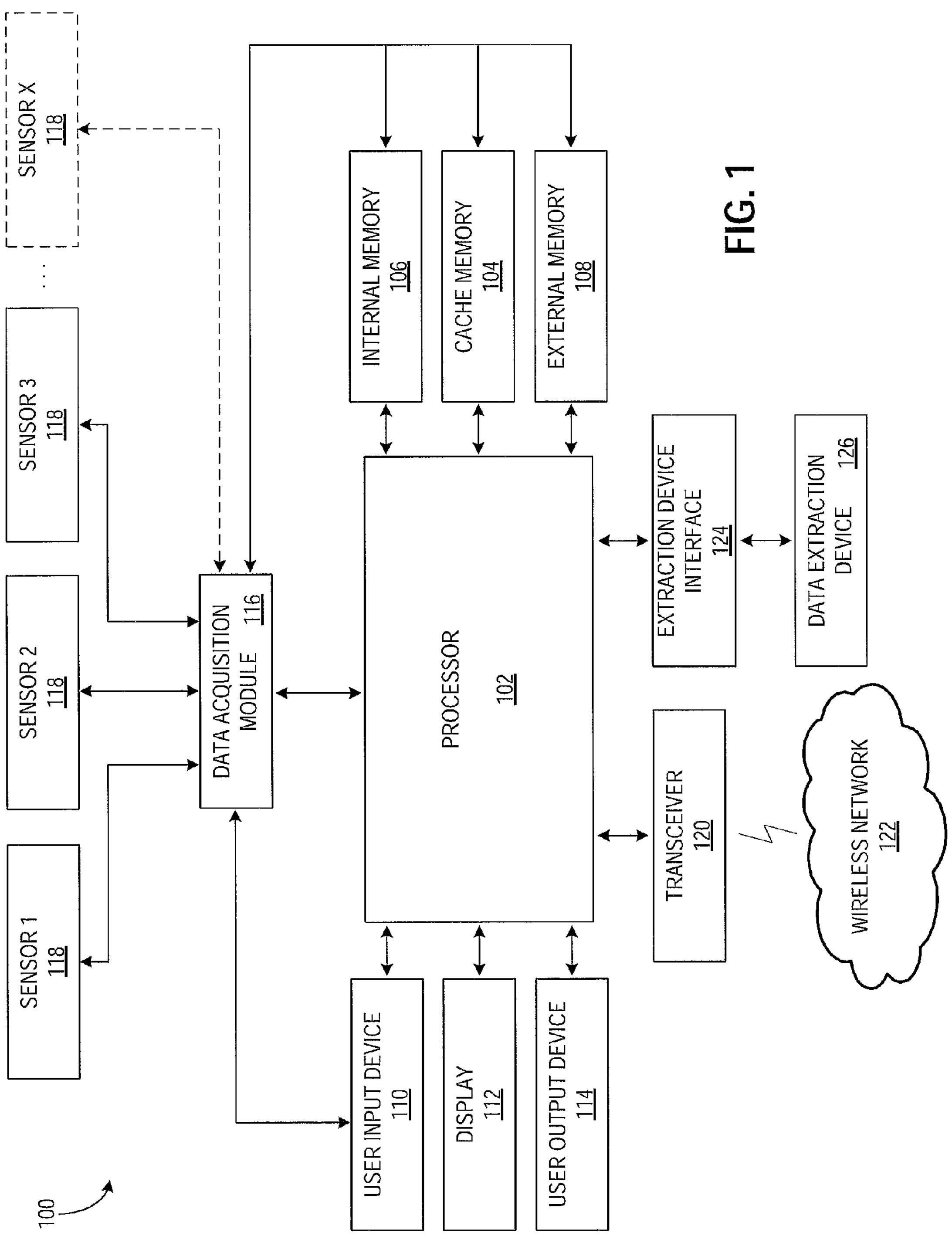
FIG. 1 illustrates an exemplary embodiment of various components of a mobile device (MD)/personal event data recorder (PEDR), according to the present invention.

Referring now to the drawings in which like numerals represent like elements throughout the several views, FIG. 1 illustrates various components of an exemplary mobile device (MD)/personal event data recorder (PEDR) 100, according to the present invention. The illustrated MD components are those typical of a mobile telecommunications device and are known to those skilled in the art. The illustrated PEDR components are merely exemplary of one embodiment of the present invention. Alternative embodiments may require more or less components, the complexity of which may be a higher or lesser degree than as described herein.

The following description assumes that the components of the PEDR/MD 100 comprise a single device (i.e., a MD with PEDR capabilities). It should be understood, however, that separate devices such as an add-on PEDR operatively linked to a MD are also contemplated. It is further contemplated that in this alternative embodiment, the MD is configured with an interface to accept the add-on PEDR. This interface can allow for the PEDR to be externally or internally operatively linked via a direct connection cable such as a serial cable, a Universal Serial Bus (USB) cable, an IEEE 1394 Firewire cable, an Ethernet cable, or another type of data cable known to those skilled in the art. Wireless interfaces such as infrared, Infrared Data Association (IrDA), Bluetooth, IEEE 802.x, and the like are also contemplated. A proprietary wired or wireless interface may also be used. Further, the add-on PEDR may be housed within the MD housing or may be self-contained and operable external to the MD housing, for example, via one of the above-described wired or wireless interfaces.

The illustrated MD/PEDR 100 includes a processor 102 that is operatively linked to a cache memory 104, an internal memory 106, and an external memory 108. The cache memory 104, the internal memory 106, and the external memory 108 may be any type known to those skilled in the art and may be of any capacity.

In the illustrated embodiment, processor and memory resources are shared between the MD components and the PEDR components. In alternative embodiments, however, an add-on PEDR may comprise one or more processors and/or memory modules so as not to utilize an undesired percentage of the host MD’s resources. In further alternative embodiments, the PEDR is self-sufficient with regard to processor and memory resources.

Also in communication with the processor 102 are a number of input/output devices such as a user input device 110, a display 112, and a user output device 114. The user input device 110 can include one or more of a keypad, a scroll wheel, a microphone, and a touchscreen. It is contemplated that the keypad can comprise a number of keys, one of which may be configured as an emergency key. The emergency key can be functional to activate various sensors 118 and further functional to initiate a recording period, wherein event data can be collected via sensors 118, recorded, and stored in the memory 104, 106, 108. It is further contemplated that a sequence of keys can be used to provide similar functionality. The sequence can be defined by the manufacturer of the device, a vendor, and/or by the user.

The display 112 can be, for example, an electronic paper display, a vacuum fluorescent display (VFD), a liquid crystal display (LCD), a light-emitting diode (LED) display, an organic light-emitting diode (OLED) display, a plasma display, a surface-conduction electron-emitter display (SED), a carbon nanotube (CNT) display, a nanocrystal (NC) display, any combination and/or variation thereof, and the like. The user output device 114 can be, for example, a speaker.

The illustrated integrated PEDR includes a data acquisition module 116 that is configured to accept data input from various sensors 118. The data acquisition module 116 can function simply as a sensor hub, providing multiple wired and wireless connection types to which the sensors 118 connect. The data acquisition module 116 can provide further functionality in categorizing, filtering, and/or otherwise manipulating the input data, based upon a number of settings that may be pre-defined by a manufacturer or vendor of the device and/or sensor, may be user-defined, or a combination thereof.

The sensors 118 are used to collect data after an event trigger provides an indication of a potential emergency situation. Exemplary emergency situations include a personal emergency situation such as abduction, theft, assault, a vehicular emergency such as a wreck or a home burglary. Other emergency situations are contemplated. The event trigger can be, for example, an emergency key press, an emergency key sequence press, the activation of one or more sensors 118, voice recognition, and the like.

The sensors 118 may include, but are not limited to, complex sensor systems such as a still camera or video camera, and other sensors such as accelerometers, impact sensors, or biometric sensors. Numerous other sensors known to those skilled in the art are also contemplated. These sensors 118 can be integral to the PEDR/MD 100 and/or integral to a separate MD and/or PEDR. Alternatively, sensors 118 are operatively linked to the PEDR and/or the MD to record other types of data that are not capable of being recorded through the integrated sensors. These external sensors can be components of a sensor system such as, but not limited to, a vehicle sensor system or a security sensor system. Settings can be utilized to increase or decrease the sensitivity of the sensors 118 and thus offer a higher degree of control over when and under what conditions to record event data.

Event data acquired by the sensors 118 is sent to the data acquisition module 116 and can be stored temporarily or permanently in a memory, for example, memory 104, 106, 108. The memory can incorporate a security mechanism such that event data may only be recorded a specified number of times. For example, a memory that is allocated to record event data can be configured to write-once. That is, the memory can record event data for a specified time once before it either needs to be replaced or reset. Methods for implementing such functionality are known to those skilled in the art.

An event data recording period can be established to specify the amount of time to record event data. The event data recording period can be pre-set to a default factory setting and can be changed via user selectable and/or user-defined settings. Further, the event triggers used to initialize an event data recording period can also be set to a default setting and may be changed via user selectable settings and/or user-defined settings. In one embodiment, the recording period can be set for continuous loop operations, wherein the recording period restarts after a specified amount of time. A continuous loop operation can be prematurely stopped in response to an event trigger received via one or more of the sensors 118. At this point, the event data would be stored in memory and optionally write protected. Other embodiments can utilize a pre-set recording time. In these embodiments, event data is recorded for the specified time.

Figure 2:
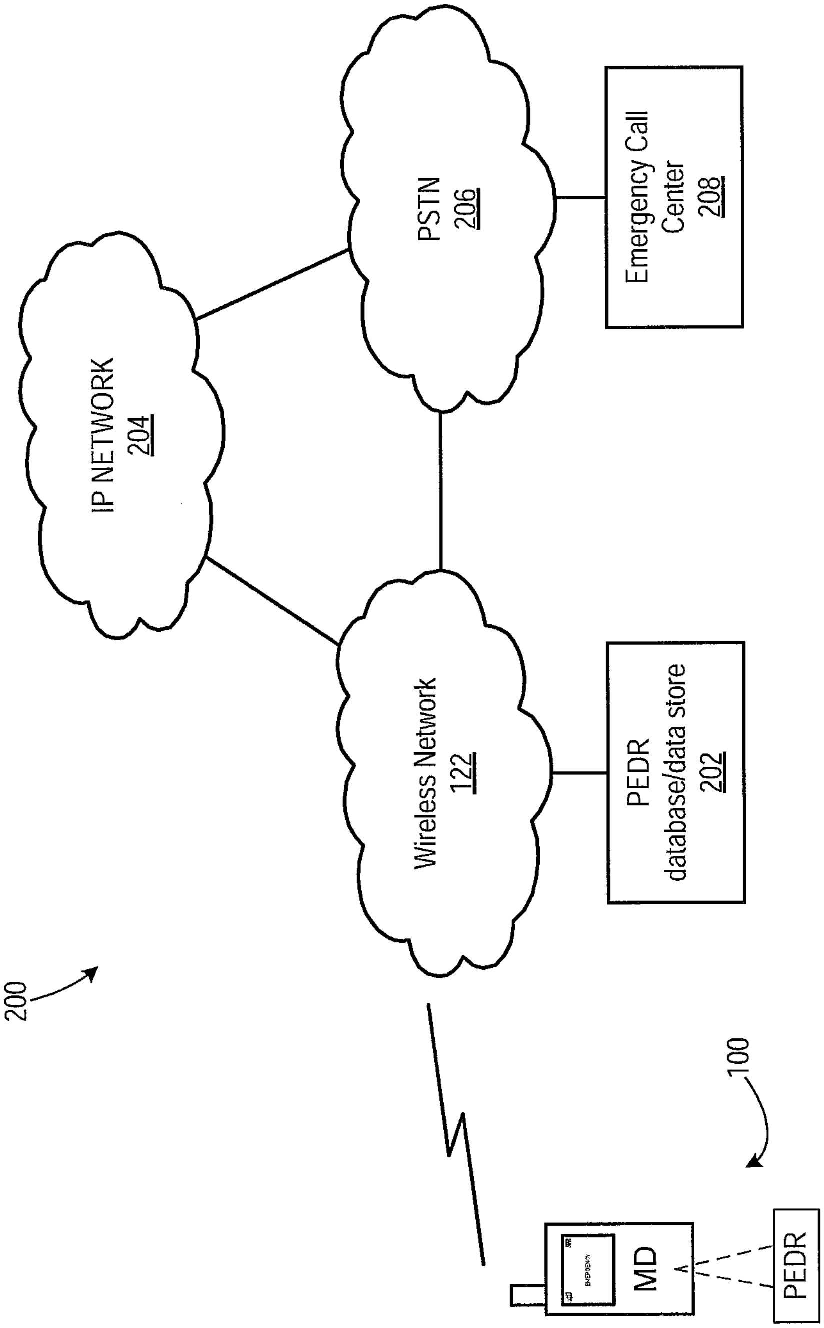
FIG. 2 illustrates an exemplary embodiment of a MD/PEDR in communication with a wireless network, according to the present invention.

Alternatively or in addition, event data can be transmitted via a transceiver 120 to a wireless network 122. The wireless network 122 can include network elements known to those skilled in the art and, additionally a PEDR database 202 as is best shown in FIG. 2. Event data that is transmitted from the MD/PEDR 100 is received by the wireless network 122 and stored in the PEDR database 202. The PEDR database 202 can also be configured to store subscriber data such as personal data and subscription data. Alternatively, the PEDR database 202 is in communication with other databases such as a subscriber database to retrieve like information. Regardless of the source, this additional data can be useful by investigators and other privileged entities to determine the events before, during, and/or after an emergency situation.

It is contemplated that the PEDR database 202 can also be configured to report an emergency situation to an appropriate authority such as an emergency call center 208 (as shown in FIG. 2) after an indication of an emergency situation is captured by a MD/PEDR 100. The emergency call center 208 can then locate the position of the MD/PEDR 100 via Global Positioning Systems (GPS), triangulation techniques, and other location determining methods known to those skilled in the art. Alternative embodiments can allow the MD/PEDR to communicate directly with the emergency call center 208. Settings may be established for these options.

A data extraction device interface 124 can be used to operatively link the MD/PEDR 100 to a data extraction device 126 such as, but not limited to, a computer or a dedicated readout system. The data extraction device interface 124 can comprise various interface types known to those skilled in the art, for example, serial, USB, IEEE 1394 Firewire, IEEE 802.x, Ethernet, and the like. Proprietary interface types are also contemplated.

The data extraction device 126 can be configured with software to extract data from the PEDR and save the extracted data in a human readable file type known to those skilled in the art or in a proprietary file type. The software can further be configured to organize data into a number of categories based upon data type or another categorization method for easier review of event data. The software may also be configured with one or more security features that enable valid users to view the extracted event data. These security features may or may not be linked to any security mechanisms used by the MD/PEDR 100.

Referring now to FIG. 2, an exemplary communications system 200 according to the present invention is shown. The illustrated communications system 200 includes the MD/PEDR 100 in communication with the wireless network 122 via any means for wireless communication. Means for wireless communication can include, but is not limited to, Frequency Division Multiple Access (FDMA), Time Division Multiple Access (TDMA), Global System for Mobile Communications (GSM), Wideband Code Division Multiple Access (WCDMA)/Universal Mobile Telecommunications System (UMTS), General Packet Radio Service (GPRS), Enhanced Data rates for Global System for Mobile Communications Evolution (EDGE)/Enhanced Generic Packet Radio Service (EGPRS), Code Division Multiple Access (CDMA), Code Division Multiple Access 2000 (CDMA2000), any combination and/or variation thereof, and the like.

Various network elements known to those skilled in the art comprise the wireless network 122. These elements are dependent upon the means for wireless communication used by the wireless network 122. The illustrated wireless network 122 further comprises a PEDR database 202 that can be configured to store event data and optionally subscriber data such as personal information, subscription information and the like. In alternative embodiments, the PEDR database 202 obtains subscriber data from a separate network element such as a subscriber information database.

Event data may be transmitted to the wireless network 122 via a variety of methods. One such method is for the MD/PEDR 100 to establish a data session via, for example, GPRS. This data session would allow the MD/PEDR 100 to send event data in real-time or close to real-time to the PEDR database 202. Another method can utilize a control channel to transmit the event data. Yet another method can utilize one or more text messages, multimedia messages, email messages, voice messages, and like messages to send the event data as attachments or embedded within the message.

Settings can be established for various data types to be sent via specific transmission methods. These settings can be, for example, user selectable, user-defined, pre-defined, or permanently set by the MD 202 manufacturer.

The wireless network 122 is in communication with an Internet Protocol (IP) network 204 and the Public Switched Telephone Network (PSTN) 206 to which an emergency call center 208 may be linked. The emergency call center 208 may be configured to retrieve event data from the PEDR database 202 automatically or the emergency call center 208 may request the event data. In addition to event data, location data can be acquired via any methods known to those skilled in the art to estimate the location of the MD/PEDR 100.

Other MD users in communication with the wireless network 122 or landline telephone users that are linked to the PSTN 206 can be identified as emergency contacts on the MD/PEDR 100. Emergency contact information may be sent with the event data to the PEDR database 202 or, alternatively, a text message, a multimedia message, an email, a device-generated voice message, a pre-recorded user voice message, and/or a like message may be sent to these contacts to notify them of a potential emergency situation. Emergency contact information can also be stored as part of subscriber data stored in the PEDR database 202 or a dedicated subscriber database.

Figure 3:
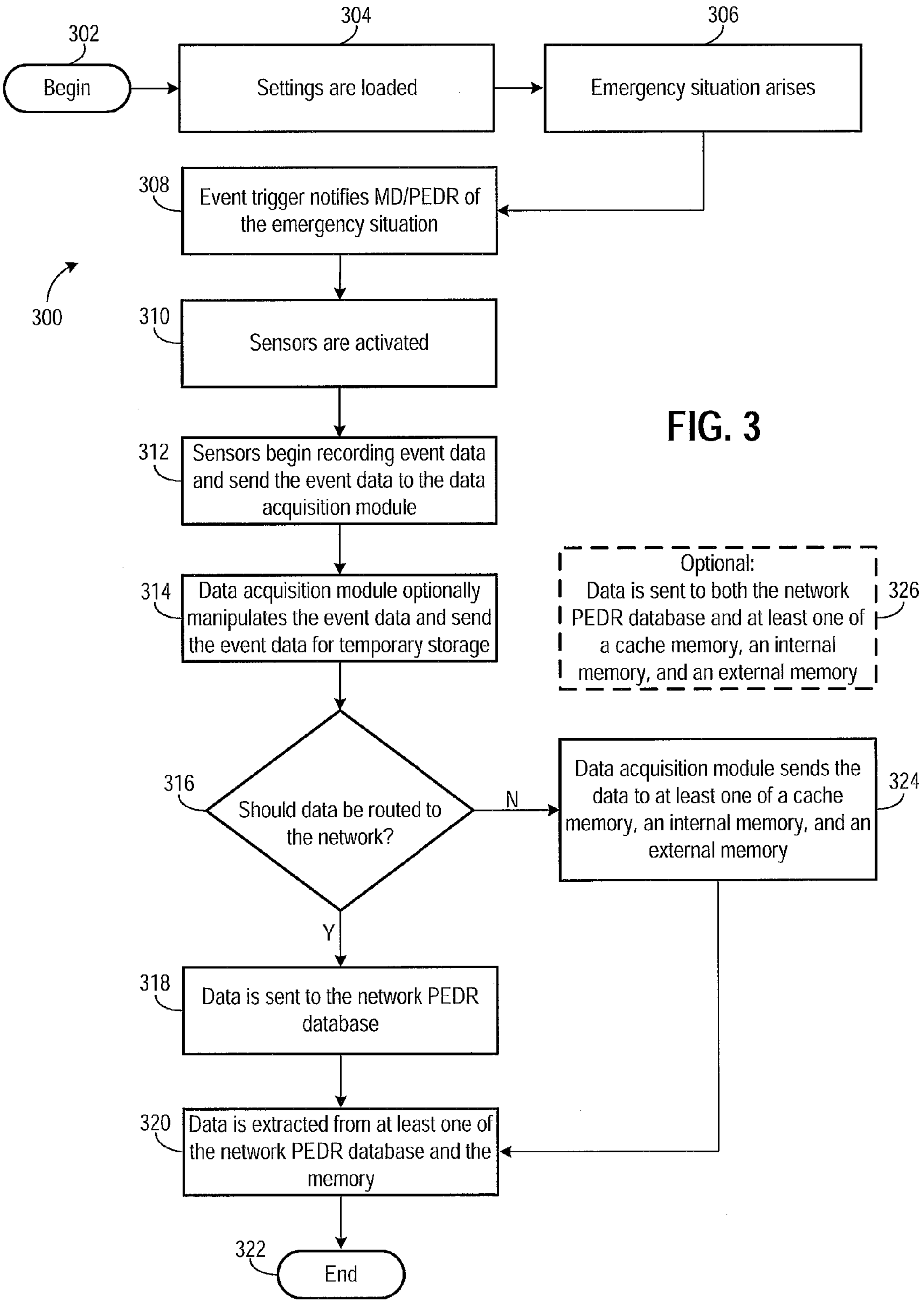
FIG. 3 illustrates a flow chart of an exemplary method for handling event data during a personal emergency situation, according to the present invention.

Referring now to FIG. 3, a flow chart of an exemplary method 300 for handling event data during a personal emergency situation is shown, according to the present invention. It should be understood that the steps described herein with reference to FIG. 3 are not limited to the order shown.

The method 300 begins at step 302 and proceeds to step 304, wherein settings are loaded. The settings may be loaded, for example, during a power on sequence of the MD/PEDR 100 or during an emergency standby mode, which may be selectable by a user. Settings such as sensor settings, recording settings, and the like are loaded at this step.

The exemplary method 300 then proceeds to step 306, wherein a personal emergency situation arises. As mentioned previously, a personal emergency situation can be, for example, an assault, abduction, theft, or any other emergency situation a user of a PEDR-equipped MD may encounter. At step 308, an event trigger can notify the MD/PEDR 100 of the emergency situation. The event trigger can be, for example, an emergency key press, an emergency key sequence press, detection by one or more sensors 118, voice recognition, and the like. Various detection threshold values can also be assigned for the sensors 118 that are used to detect an emergency situation. By way of example and not limitation, a heart rate above a specified threshold value can be detected by a heart rate sensor. The heart rate sensor can then send a signal to activate the other sensors to gather additional event data. Like the various settings described herein, these threshold values can be, for example, user selectable, user-defined, and/or pre-defined and may additionally be loaded with the settings during step 304.

After the event trigger notifies the MD/PEDR 100 that an emergency has occurred, the exemplary method 300 proceeds to step 310, wherein the sensors 118 are activated. If the event trigger utilizes one or more sensors 118, then additional sensors 118 are activated. The sensors can be assigned settings such that only specific sensors are activated for certain situations. Further settings can provide for specific sensors to be used based upon the type of event trigger. For example, an emergency key sequence press may indicate one type of emergency situation, whereas another emergency key sequence press may indicate another type. These settings are also applicable to other event trigger types and are loaded during step 304. The exemplary method then proceeds to step 312.

At step 312, the sensors 118 begin recording event data and subsequently forward this data to the data acquisition module 116. Initial event data such as the data acquired during an event trigger can also be sent at this time or prior to the sensors being activated.

The method then proceeds to step 314, wherein the data acquisition module 116 receives the event data and optionally manipulates the event data prior to sending it to the memory 104, 106, 108 for temporary storage. At step 316, a decision is made whether to send the event data to the network. The decision can be dictated by a setting, which may be loaded during step 304.

If at step 316 a decision is made to route the event data to the network, then the method 300 proceeds to step 318, wherein the event data is sent to the network PEDR database 202. The event data is extracted from the PEDR database 202 at step 320. The method 300 ends at step 322.

Conversely, if at step 316 a decision is made to route the event data to the MD/PEDR 100, then the processor 102 sends a notification to the memory 104, 106, 108 to store the event data at step 324. The event data is extracted from the memory 104, 106, 108 at step 320. The method ends at step 322.

In alternative embodiments, a setting is enabled to send event data to both the PEDR database 202 and the memory 104, 106, 108 as indicated by optional step 326.

Figure 4:
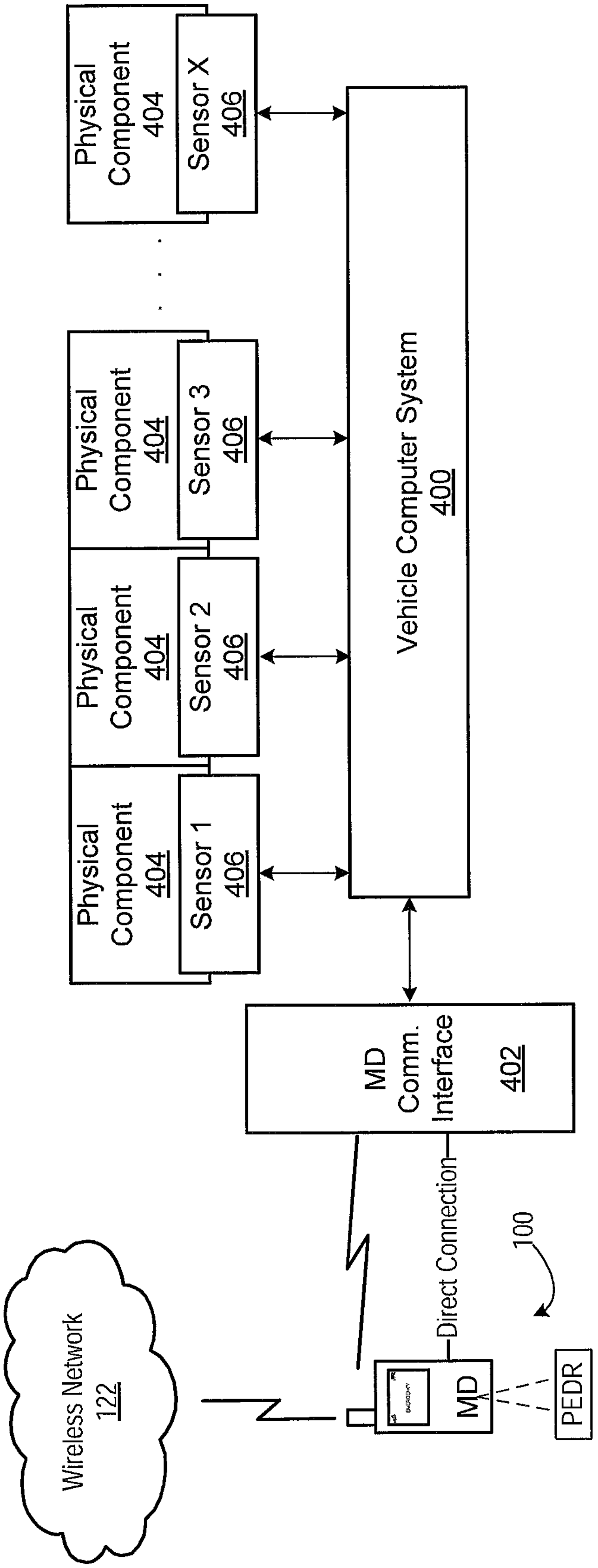
FIG. 4 illustrates an exemplary embodiment wherein the MD/PEDR is in communication with a vehicle computer system, according to the present invention.

Referring now to FIG. 4, an exemplary embodiment wherein the MD/PEDR 100 is used with a vehicle computer system 400 is illustrated, according to the present invention. Vehicles are typically equipped with sensors such as accelerometers, impact sensors, airbag deployment sensors, brake sensors, and the like. These sensors may be in communication with a vehicle event data recorder (VEDR).

The present invention allows the MD/PEDR 100 to communicate with a vehicle's computer system 400 via a MD communications interface 402. The present invention also allows the MD/PEDR 100 to communicate with a vehicle's VEDR, if applicable. The MD communications interface 402 may be installed by the vehicle manufacture or added as an aftermarket accessory. Further, the MD communications interface 402 can be removably insertable in the vehicle, allowing the interface 402 to be used in multiple vehicles. Software can be developed that allows the MD communications interface 402 to communicate with the vehicle's computer system 400 and thus acquire data from a plurality of sensors 406 that are configured to monitor a plurality of physical components 404 such as airbags, safety belts, engine components, steering components, suspension components, brake components, and the like. Other sensors 406 can be used to monitor acceleration, vehicle roll angle, and other like metrics. The types of physical components 404 and sensors 406 can be any known to those skilled in the art.

The MD communications interface 402 can be in communication with the vehicle computer system 400 via, for example, an on-board diagnostics (OBD) port. Other interfaces with the vehicle computer system 400 can be provided via common wired connection types such as, but not limited to, serial cable, USB cable, IEEE 1394 Firewire cable, and Ethernet cable, or another data cable type known to those skilled in the art. Alternatively, a wireless connection is used such as one provided by infrared, Infrared Data Association (IrDA), Bluetooth, IEEE 802.x, and the like. Proprietary communication interface types can also be used.

The MD/PEDR 100 can be configured with a setting to activate a vehicle mode to initiate communication via the MD communications interface 402 if, for example, the MD/PEDR 100 is within range of a wireless transceiver. A vehicle mode can also be activated upon direct connection to the MD communications interface 402. Settings can also allow for the MD/PEDR 100 to record data from sensors 118 in addition to the vehicle sensors 406.

In some embodiments, the MD/PEDR 100 is in communication with a VEDR. Data acquired during a wreck can be sent via a wireless or wired connection to the MD/PEDR 100 and stored in memory 104, 106, 108. In other embodiments, the MD/PEDR 100 is in direct communication with one or more sensors positioned within the vehicle.

The MD/PEDR 100 can be in communication with the wireless network 122 and can send acquired wreck data for storage in the PEDR database 202.

Certain adverse events can include more than one component. In these events, algorithms can be provided to detect, via one or more sensors, the beginnings and ends of each of the components and record the associated data.

Figure 5:
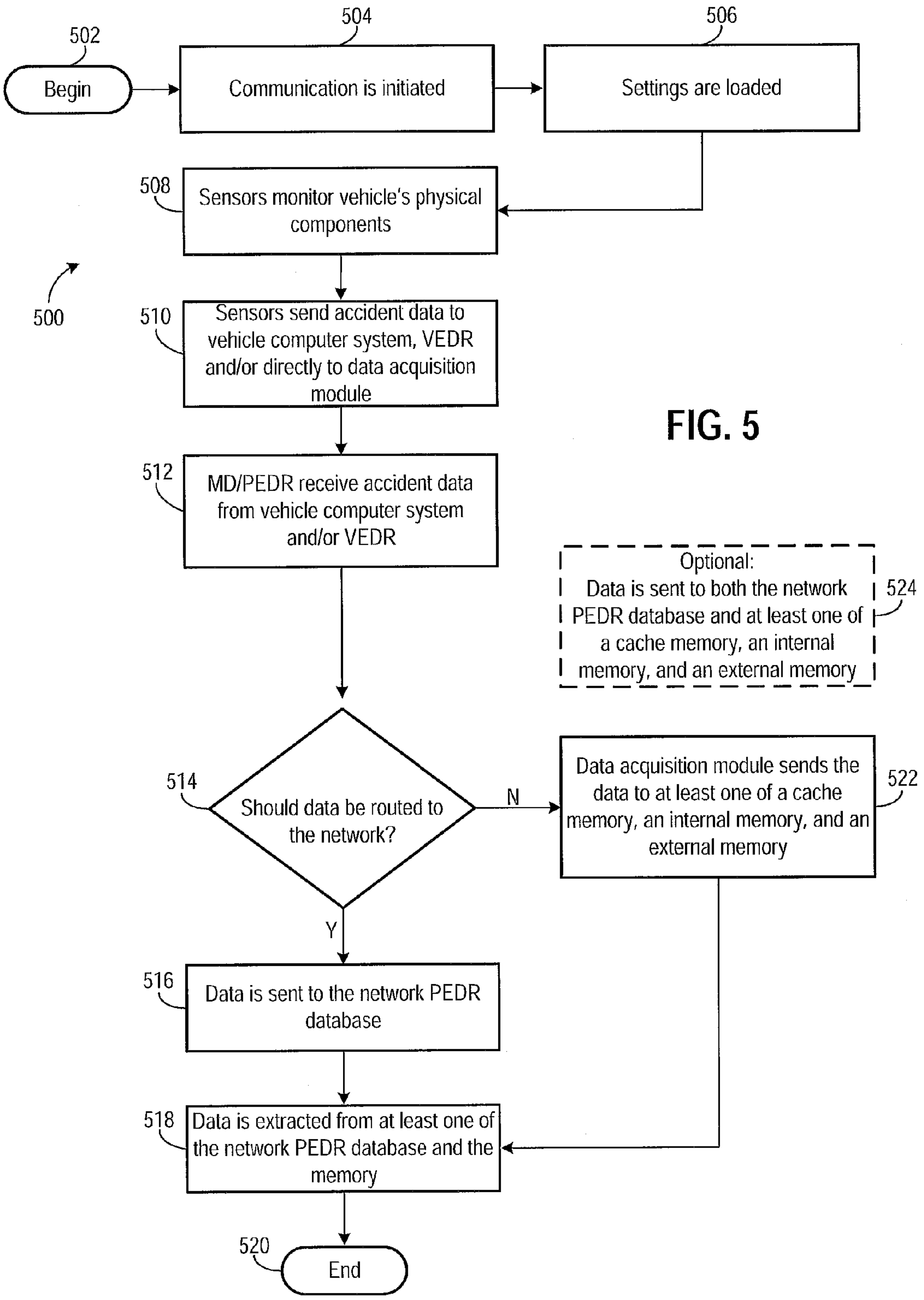
FIG. 5 illustrates a flow chart of an exemplary method for acquiring event data from a vehicle computer system, according to the present invention.

Referring now to FIG. 5, a flow chart of an exemplary method 500 for acquiring event data from a vehicle computer system 400 is shown, according to the present invention. It should be understood that the steps described herein with reference to FIG. 5 are not limited to the order shown.

The method 500 begins at step 502 and proceeds to step 504, wherein communication between the MD/PEDR 100 and the MD communications interface 402 is established. After communication is established, the method 500 proceeds to step 506 wherein settings such as sensor settings for both the MD/PEDR sensors 118 and vehicle sensors 406, and recording settings can be loaded.

At step 508, the vehicle sensors 406 begin monitoring the vehicle's physical components 404. If the data received by the one or more of the sensors 406 reaches or exceeds a specified threshold value, then the sensors 406 can send wreck data to the vehicle computer system 400, the VEDR, and/or directly to the MD/PEDR data acquisition module 116, as shown in step 510. The method 500 then proceeds to step 512 wherein the MD/PEDR 100 can receive wreck data from the vehicle computer system 400 and/or the VEDR.

At step 514, a decision is made whether to send the wreck data to the network. The decision can be dictated by a setting, which may be loaded during step 506.

If at step 514 a decision is made to route the event data to the network, then the method 500 proceeds to step 516, wherein the event data is sent to the network PEDR database 202. The event data is extracted from the PEDR database 202 at step 518. The method 300 ends at step 520.

Conversely, if at step 514 a decision is made to route the wreck data to the MD/PEDR 100, then the processor 102 sends a notification to the memory 104, 106, 108 to store the wreck data at step 522. The wreck data is extracted from the memory 104, 106, 108 at step 518. The method ends at step 520.

In alternative embodiments, a setting is enabled to send event data to both the PEDR database 202 and the memory 104, 106, 108 as indicated by optional step 524.

Although an exemplary vehicle computer system 400 has been described herein as a peripheral sensor system from which the MD/PEDR 100 may acquire event data, other sensor system may be used such as a home security system. The home security system can be configured to record data from a variety of sensors such as, but not limited to, motion sensors, window break sensors, door sensors, temperature sensors, smoke sensors, poisonous gas sensors, and the like. This information can then be sent to the MD/PEDR 100 for storage and/or sent to a network node such as one associated with the security system manufacturer or vendor. Further, the MD/PEDR 100 can record data as previously described. This data can be sent to the security system and the security system can then notify the security system monitor. Comparable security systems for office buildings, hospitals, airports, and the like can be configured to function with the features of the MD/PEDR 100.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A mobile telecommunications device comprising;
a processor;
a plurality of sensors, wherein one of the plurality of sensors comprises a biometric sensor associated with the processor; and
a memory storing instructions that when executed by the processor cause the processor to perform operations comprising
monitoring data from the biometric sensor,
determining, based on the data from the biometric sensor, that an event trigger has occurred,
in response to determining that the event trigger has occurred, activating a sensor from the plurality of sensors, manipulating a sensitivity of the biometric sensor, and
in response to activating the sensor from the plurality of sensors, storing, to the memory, event data collected by the biometric sensor and the sensor from the plurality of sensors that is activated.

2. The mobile telecommunications device of claim 1, wherein the event trigger comprises a type of event trigger and wherein the sensor activated from the plurality of sensors is based on the type of event trigger of the event trigger.

3. The mobile telecommunications device of claim 1, wherein the event trigger comprises a threshold value and wherein determining, based on the data from the biometric sensor, that the event trigger has occurred comprises determining, based on the data from the biometric sensor, that the data exceeds the threshold value.

4. The mobile telecommunications device of claim 1, wherein the memory stores a setting.

5. The mobile telecommunications device of claim 1, wherein the setting identifies an event recording period.

6. The mobile telecommunications device of claim 1, wherein the operations further comprise sending the event data to a storage node.

7. The mobile telecommunications device of claim 1, wherein a sensor input associated with an external sensor.

8. The mobile telecommunications device of claim 1, wherein an extraction device interface associated with a data extraction device.

9. A mobile telecommunications device comprising:
a processor;
a plurality of sensors, where one of the plurality of sensors comprises a biometric sensor associated with the processor; and
a memory storing instructions that when executed by the processor cause the processor to perform operations comprising
monitoring data from the biometric sensor,
determining, based on the data from the biometric sensor, that an event trigger has occurred, wherein the event trigger comprises a threshold value and wherein determining, based on the data from the biometric sensor, that the event trigger has occurred comprises determining, based on the data from the biometric sensor, that the data exceeds the threshold value, in response to determining that the event trigger has occurred, activating a sensor from the plurality of sensors, manipulating a sensitivity of the biometric sensor, storing the event data in response to activating the sensor, and transmitting the event data to a storage node.

10. The mobile telecommunications device of claim 9, wherein the event trigger comprises a type of event trigger and wherein the sensor activated from the plurality of sensors is based on the type of event trigger of the event trigger.

11. The mobile telecommunications device of claim 9, wherein the memory stores a setting.

12. The personal event data recorder of claim 11, wherein the setting identifies an event recording period.

13. The mobile telecommunications device of claim 9, wherein the operations further comprise saving the event data at the storage node.

14. The mobile telecommunications device of claim 9 further comprising a sensor input associated with an external sensor.

15. A method comprising:

monitoring, by a mobile telecommunications device comprising a processor and a plurality of sensors, data from a biometric sensor of the plurality of sensors, determining, by the processor based on the data from the biometric sensor, that an event trigger has occurred, in response to determining that the event trigger has occurred, activating, by the processor, a sensor from the plurality of sensors, manipulating, by the processor, a sensitivity of the biometric sensor, and in response to activating the sensor from the plurality of sensors, storing, by the processor to a memory of the device, event data collected by the biometric sensor and the sensor from the plurality of sensors that is activated.

16. The method of claim 15, wherein storing the event data comprises sending, by the processor, the event data to a storage node.

17. The method of claim 15, further comprising extracting, by the processor, the event data from the memory of the device.

18. The method of claim 16, further comprising extracting, by the processor, the event data from the storage node.

19. The method of claim 17, further comprising extracting, by the processor, the event data from the memory of the mobile device and a storage node.

* * * * *